(12) United States Patent
Hernes

(10) Patent No.: US 7,930,721 B1
(45) Date of Patent: Apr. 19, 2011

(54) METHOD AND SYSTEM FOR OFFERING INTERACTIVE CONTROLS IN A LODGING ENTERTAINMENT SYSTEM

(75) Inventor: Eric Leslie Hernes, Sioux Falls, SD (US)

(73) Assignee: Lodgenet Interactive Corporation, Sioux Falls, SD (US)

( * ) Notice: Subject to any disclaimer, the term of this patent is extended or adjusted under 35 U.S.C. 154(b) by 2063 days.

(21) Appl. No.: 10/405,711

(22) Filed: Apr. 2, 2003

(51) Int. Cl.
*H04N 7/18* (2006.01)

(52) U.S. Cl. .............. 725/78; 725/79; 386/94; 386/125

(58) Field of Classification Search .................... 725/40, 725/86, 87, 91, 93, 98, 78, 79; 386/94, 125
See application file for complete search history.

(56) References Cited

U.S. PATENT DOCUMENTS

| | | | |
|---|---|---|---|
| 5,357,276 A | 10/1994 | Banker et al. | 348/7 |
| 5,600,364 A * | 2/1997 | Hendricks et al. | 725/9 |
| 5,710,887 A * | 1/1998 | Chelliah et al. | 705/26 |
| 5,889,775 A * | 3/1999 | Sawicz et al. | 370/360 |
| 6,058,288 A | 5/2000 | Reed et al. | 455/6.3 |
| 6,160,989 A * | 12/2000 | Hendricks et al. | 725/36 |
| 6,198,468 B1 | 3/2001 | Cho | 345/141 |
| 6,353,450 B1 * | 3/2002 | DeLeeuw | 715/768 |
| 6,392,664 B1 * | 5/2002 | White et al. | 715/717 |
| 6,463,585 B1 * | 10/2002 | Hendricks et al. | 725/35 |
| 6,542,169 B1 | 4/2003 | Marshall et al. | 345/781 |
| 6,738,775 B2 * | 5/2004 | Asherman | 707/10 |
| 6,738,978 B1 * | 5/2004 | Hendricks et al. | 725/35 |
| 6,774,926 B1 * | 8/2004 | Ellis et al. | 348/14.01 |
| 6,937,730 B1 * | 8/2005 | Buxton | 380/241 |
| 7,068,266 B1 | 6/2006 | Ruelle | |
| 7,181,474 B2 * | 2/2007 | Asherman | 707/202 |
| 2001/0005446 A1 * | 6/2001 | Uchikoga | 386/94 |
| 2001/0034771 A1 * | 10/2001 | Hutsch et al. | 709/217 |
| 2002/0048449 A1 * | 4/2002 | Mineyama | 386/46 |
| 2002/0065795 A1 * | 5/2002 | Asherman | 707/1 |
| 2002/0104083 A1 * | 8/2002 | Hendricks et al. | 725/34 |
| 2003/0084449 A1 * | 5/2003 | Chane et al. | 725/46 |
| 2003/0088872 A1 * | 5/2003 | Maissel et al. | 725/46 |
| 2003/0145323 A1 * | 7/2003 | Hendricks et al. | 725/34 |
| 2004/0111742 A1 * | 6/2004 | Hendricks et al. | 725/34 |
| 2004/0131020 A1 * | 7/2004 | Smith | 370/312 |
| 2004/0131076 A1 * | 7/2004 | Smith | 370/432 |
| 2004/0137929 A1 * | 7/2004 | Jones et al. | 455/517 |
| 2004/0172397 A1 * | 9/2004 | Asherman | 707/9 |
| 2004/0189689 A1 * | 9/2004 | Barrett | 345/719 |
| 2004/0261112 A1 * | 12/2004 | Hicks et al. | 725/89 |
| 2005/0219068 A1 * | 10/2005 | Jones et al. | 341/50 |
| 2007/0005783 A1 * | 1/2007 | Saint-Hillaire et al. | 709/230 |

* cited by examiner

*Primary Examiner* — Joseph P Hirl
*Assistant Examiner* — Jivka Rabovianski
(74) *Attorney, Agent, or Firm* — Kinney & Lange, P. A.

(57) ABSTRACT

A method and system for providing interactive controls using interactive video animation software for use in conjunction with content provided by a lodging entertainment system are disclosed. The lodging entertainment system includes a head end with a digital content server and a plurality of guest terminals connected by a distribution system. A display of interactive controls is transmitted with the content from the head end to a guest terminal. This preferably occurs in response to pressing a key on a remote control at the guest terminal. Then, interactive control selection data representing the interactive control selected by a guest is transmitted from the guest terminal to the head end. After processing the interactive control selection data at the head end, transmission of the content from the head end to the guest terminal is adjusted in accordance with the interactive control selected by the guest.

24 Claims, 4 Drawing Sheets

_US 7,930,721 B1_

METHOD AND SYSTEM FOR OFFERING INTERACTIVE CONTROLS IN A LODGING ENTERTAINMENT SYSTEM

CROSS-REFERENCE TO RELATED APPLICATION(S)

None.

BACKGROUND OF THE INVENTION

The present invention relates to systems that provide in-room entertainment at hotels and other lodging facilities. In particular, the present invention is a method and system for delivering interactive controls for in-room entertainment.

The past two decades have seen the wide scale introduction of entertainment systems in hotels and other lodging facilities. These systems provide a variety of services to the guest through the guest room television. The services typically include regular off-air television programs, pay-per-view movies, Internet access, and guest services such as video shopping and video checkout.

A typical hotel entertainment system contains a head end, a distribution system, and guest terminals located in each of the guest rooms. The head end includes devices to generate entertainment content such as movies and video games, as well as devices to provide Internet access and generate interactive menus and other services. The head end also includes modulators necessary to place the television signals from the various sources on to the appropriate channels for transmission through the distribution system to the guest terminals. A host computer coordinates operation of the entertainment system by receiving key stroke information from the guest terminals and controlling operations of various sources of television signals so that the guest receives the entertainment or services which he or she has requested.

Typically, lodging entertainment systems are not owned by the hotel, but rather are owned by a vendor who provides the head end equipment, and the guest terminals (including the television, remote control, game controller, keyboard, and associated control circuitry which interfaces the television to the distribution system).

The entertainment system vendor owns the equipment and pays for the installation of the system in the lodging facility. The vendor must also provide the content, such as movies, games, and cable/satellite programming. The vendor receives compensation based upon amounts the hotel collects from the guest for pay-per-view movies, games, Internet access, and other services for which charges are made. The hotel usually receives a percentage of the guest charges, and the sources of content, such as motion picture studios and game program vendors, receive royalties for movies and games which are viewed and played by guests.

There is a continuing need for new and improved offerings which will result in higher purchase rates through the lodging entertainment system. At the same time, any additional products/services which also require significant increases in capital investment in the entertainment systems are difficult to justify. For example, if a new service will require additional capital equipment to be installed in every guest room, or will require the addition of expensive hardware or software at the head end, the total cost of the additional hardware and software must be weighed against the increase in purchases which can be expected from the additional capital investment.

BRIEF SUMMARY OF THE INVENTION

The present invention is a method and system for providing interactive controls using interactive video animation software for use in conjunction with content provided by a lodging entertainment system. The lodging entertainment system includes a head end with a digital content server and a plurality of guest terminals connected by a distribution system. A display of interactive controls is transmitted with the content from the head end to a guest terminal. This preferably occurs in response to pressing a key on a remote control at the guest terminal. Then, interactive control selection data representing the interactive control selected by a guest is transmitted from the guest terminal to the head end. After processing the interactive control selection data at the head end, transmission of the content from the head end to the guest terminal is adjusted in accordance with the interactive playback control selected by the guest.

DETAILED DESCRIPTION

Figure 1:
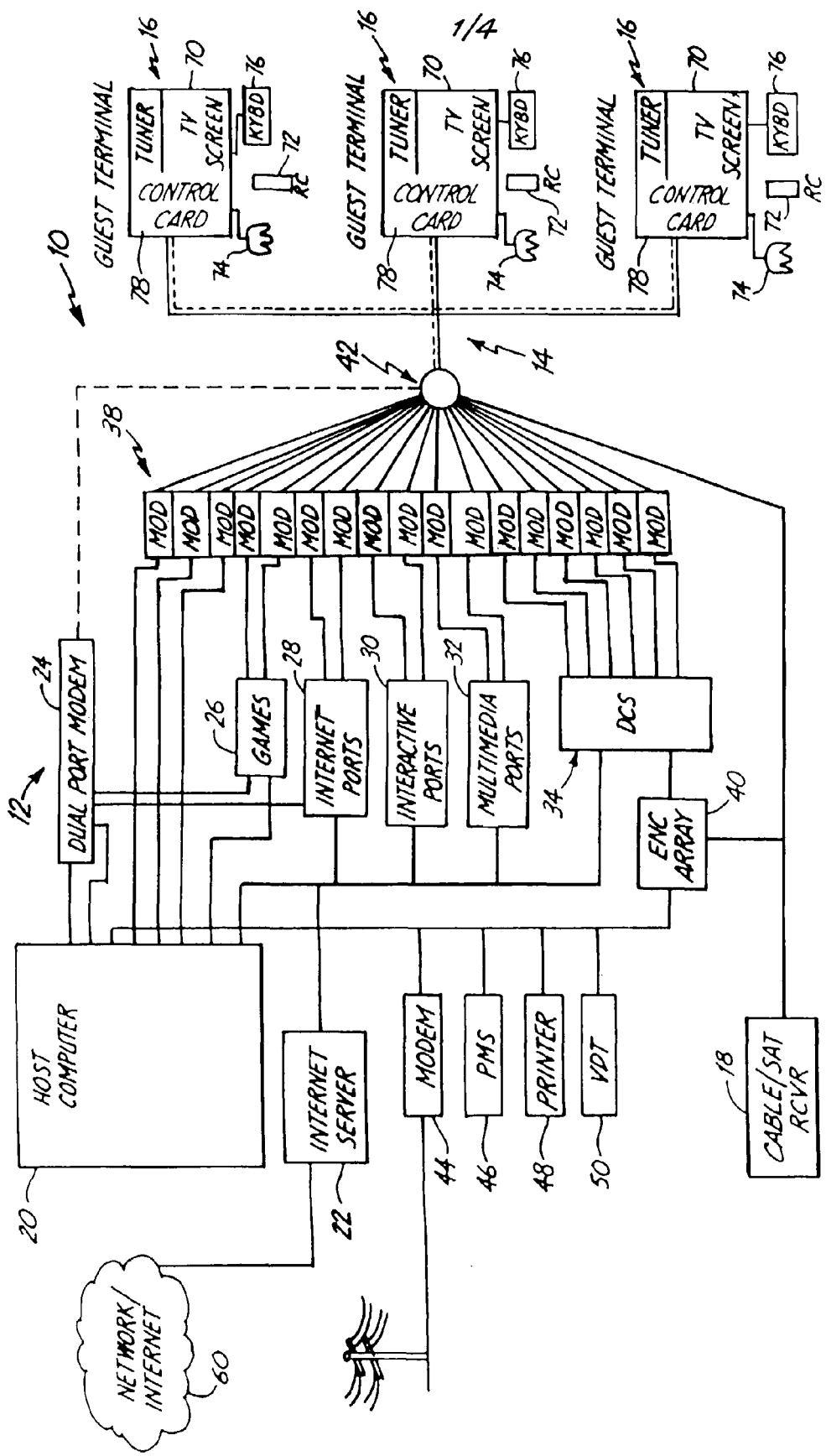
FIG. 1 is a block diagram of a hotel entertainment system capable of providing interactive controls.

FIG. 1 is a block diagram showing a system overview of hotel entertainment system 10 which delivers television programming, digital music, video-on-demand (VOD) movies, interactive video games, Internet access, and other interactive video services to individual guest rooms of a hotel or other lodging facilities. Among the services offered to the guest is the ability to view VOD movies and listen to digital music as desired using VCR-like interactive playback controls, such as play, pause, stop, skip-forward, and skip-back. Entertainment system 10 includes four primary portions: head end 12, distribution system 14, guest terminals 16, and cable/satellite receiver 18.

Audio/video RF signals for all channels of the cable television system are provided from head end 12. The audio/video RF signals from head end 12 may include off-air local television channels, direct broadcast satellite programing, interactive menus and interactive program guides, video-on-demand programming, interactive video games, Internet services, and other interactive video and multi-media services. Based upon system control data transmitted and received via distribution system 14 from guest terminals 16, head end 12 controls the operation of interactive menus and program guides, VOD movies, interactive games, Internet services, and other interactive services.

Distribution system 14 is preferably an MATV cable distribution system conventionally used in hotels and other lodging facilities. Distribution system 14 permits the transmission of both audio/video RF signals, as well as two-way data and digital communication (typically RF) signals between head end 12 and guest terminals 16.

Head end 12 includes UNIX host computer 20 (UHC), Internet server and network interface 22, dual ported modem 24, game platform 26, Internet ports 28, interactive ports 30, multi-media ports 32, digital content server (DCS) 34, a bank of modulators 38, encoder array 40, combiner/diplexer 42, telecom modems 44, property management system (PMS) 46, printer 48, and video display terminal (VDT) 50.

UNIX host computer (UHC) 20 is, in a preferred embodiment, a computer which runs UNIX operating code, together with software for coordinating the operations of components of head end 12. UHC 20 houses several different computer cards and components. In the embodiment shown in FIG. 1, UHC includes an intelligent communications processor (ICP) card, a number of interactive video port cards, an SCSI interface card, and an ethernet card. In addition, UNIX host computer 20 also houses storage devices such as a floppy disk drive, a backup drive, a CD ROM drive, and a hard disk drive.

UHC 20 manages the operation of several other devices of head end 12, together with communication tasks. UHC 20 communicates with dual port modem (DPM) 24, encoder array 40, modem 44, property management system 46, printer 48, and video display terminal 50 over lines such as RS-232 lines connected to UHC 20.

UHC 20 is in charge of polling all of the guest terminals 16 for keystroke activity. The polling function is performed by ICP through DPM 24. ICP communicates with DPM 24 over a high speed line. The results of the polling are received back over distribution system 14 and are routed through diplexer/combiner 42 to DPM 24. Depending upon the particular keystrokes that are returned, DPM 24 will return the keystrokes to UHC 20, to game platform 26, or to Internet ports 28 through high speed lines, or other services which may be implemented.

UHC 20 communicates with game platform 26 by a high speed line between the SCSI port of UHC 20 and game platform 26. For example, game programs stored by UHC 20 are downloaded to the individual game engines of game platform 26 based upon game ordering and selection made by the guest through guest terminals 16.

UHC 20 communicates through its ethernet card with Internet server 22, Internet ports 28, interactive ports 30, multi-media ports 32 and digital content server 34. Internet server 22 provides a communication interface between head end 12 and Internet 60.

The outputs of interactive ports of UHC 20, as well as the outputs of game platform 26, Internet ports 28, interactive ports 30, multi-media ports 32, and digital content server 34 are baseband audio/video signals which are provided to inputs of a bank of modulators 38.

Game platform 26 is a device that allows a guest to purchase an interactive video game and to view that game at guest terminal 16. Game platform 26 sends game audio and video and game data through one of the modulators 38, to combiner/diplexer 42 and onto distribution system 14 to guest terminals 16.

Game platform 26 receives information from UHC 20 from the SCSI card. Keystrokes which are received back from the guest terminal 16 are received by DPM 24 and routed to the appropriate game engine of game platform 26 which corresponds to the guest who has sent the keystroke.

Internet ports 28 send audio and video information from the Internet to the appropriate guest terminal. The outputs of Internet ports 28 are connected to the appropriate modulator, so that the audio and video is placed on a channel to which the guest terminal of the guest conducting the Internet session is tuned.

Interactive ports 30 provide audio and video associated with menuing, program guides and other interactive services. These include guest services such as video checkout, interactive shopping, surveys, opinion polls, room service ordering, and the interactive controls of the present invention.

Multi-media ports 32 provide a wide variety of different audio and visual programs to a subscriber. These can include, for example, video directories, advertising, and other information services.

Digital content server 34 includes digital storage (e.g., a RAID hard disc array) with storage capacity to store all desired program content to be offered to the guest. This includes, for example, movies, music, web cinema, pre-recorded broadcast programs from a central site, and guest-selected programs recorded for time-shifted viewing. The content is stored in files in the digital storage, and each type of service has its own directory where its content is stored. The overall storage space is shared among the various services. The content is stored in an encoded format such as MPEG-2.

Digital content server 34 includes decoders for converting the stored content to baseband audio/video during playback. The outputs of digital content server 34 are output ports which are connected to selected modulators 38.

Modulators 38 convert baseband video and audio signals received at their inputs to RF and deliver the signals to combiner/diplexer 42. Each modulator is set to modulate on a specific frequency or RF channel. The outputs of modulators 38 are connected to inputs of combiner 42.

As shown in FIG. 1, cable/satellite receiver 18 receives cable or satellite programming, which is supplied to combiner/diplexer 42. Receiver 18 provides the programming (which is the free-to-guest television programs) on channels which are different from the channels produced by modulators 38. In that way, there is no channel overlap between the free-to-guest television programming and the other offerings (such as pay-per-view movies or games).

Encoder array 40 is a computer with a group of tuner/encoder cards which can be scheduled to record any channel of the cable/satellite programming from receiver 18. Multiple encoder cards allow different channels to be encoded at the same time. Encoder array 40 receives instructions as to the channel and time of encoding from UHC 20. Once the program has been encoded to a file (such as an MPEG-2 file), the data is moved to digital content server 34 via an ethernet or SCSI connection. Once the file is stored in digital content server 34, a guest can choose to playback the file (i.e., the recorded program). File names are unique, and preferably identify the guest and the program recorded so that multiple guests can have files stored in digital content server 34, and a guest can have multiple files. Recorded files can be deleted when the guest who requested recording of that program checks out, or at a predetermined time after recording. Control of deleting files is by UHC 20.

UHC 20 communicates with the owner/operator of entertainment system 10 through modem 44. The system owner and operator is typically remote from the hotel facility, and must receive usage, billing, and financial information in order to settle accounts with the hotel. In addition, control and troubleshooting information can be communicated to and from UHC 20 through modem 28.

Property management system (PMS) 46 is a computer system operated by the hotel to track charges incurred by individual guests. These charges typically include room charges, as well as dining charges, room service, telephone charges, charges for use of hotel entertainment system 10, and a variety of other charges. As charges related to system 10 are incurred, UHC 20 communicates that information to PMS 46. During video checkout operations, UHC 20 communicates with PMS 46 to obtain the data necessary to show the guest, on guest terminal 16, a folio of charges associated with that guest's room. The video checkout system allows the guest to approve the charges and to authorize payment for those charges through a credit card number previously given to the hotel and stored in property management system 46.

Guest terminal 16 includes television 70, remote control 72, game controller 74, keyboard 76, and control card 78. Each television 70 has a television screen for viewing, and has an associated television tuner and a control card which interfaces guest terminal 16 with distribution system 14 and head end 12.

Control card 78 of guest terminal 16 receives keystrokes from remote control 72, game controller 74, and keyboard 76. In the case of remote control 72, the keystrokes are in the form of infrared signals which are transmitted from an infrared transmitter within remote control 72 to an infrared receiver associated with television 70. The keystrokes are passed by control card 78 to distribution system 14 back to head end 12. The guest selects options by viewing interactive menus on the screen of television 70 and pressing keys of remote control 72 accordingly. These key presses are received and stored by control card 78. In response to polling signals from head end 12, control card 78 provides system data representing the keystrokes to head end 12 which indicates which key or keys have been pressed.

Video game controller (or game paddle) 74 is connected by a cable to television 70. Alternatively, game paddle 74 can be connected via an IR link. Keystrokes from game paddle 74 are supplied to control card 78, and then are supplied as part of system data in response to polling of guest terminals 16 by head end 12. In some embodiments, game paddle 74 includes keys which duplicate keys on remote control 72 so that game paddle 74 can be used to initiate interactive sessions and order programs without the need to use remote control 72.

Keyboard 76 is connected to television 70 either through a cable or by an IR link. Keystrokes from keyboard 76 are supplied by control card 78 of guest terminal 16 to head end 12 in response to polling. Keyboard 76 is useful for interactive services such as Internet, e-mail and computer games. Keyboard 76 can, in some cases, be used to initiate interactive sessions, order programs or select programs to be recorded, rather than using remote control 72.

When a guest wishes to use entertainment system 10, the guest presses a key on remote control 72 to turn on television 70. A welcome screen will first appear on the TV screen of guest terminal 16. If the guest wishes to view off-air or satellite programming which is free programming, those channels are accessible by pressing the channel up or channel down keys on remote control 72. If, on the other hand, the guest wishes to view and perhaps select other offerings of system 10, such as video-on-demand movies, Internet access, interactive video games, recording of broadcast programs for time-shifted viewing, or interactive services, the welcome channel screen provides an instruction to the user to select a menu. Upon pressing the menu key, a signal is provided to control card 78, which stores the keystroke information until the next time that guest terminal 16 is polled by head end 12. Alternatively, the keystroke information is polled and interpreted by an interactive animation file running at head end 12 or guest terminals 16. In response to polling, the keystroke indicating pressing of the menu key is supplied to head end 12. This results in UHC 20 selecting one of the interactive ports (which are either internal to UHC 20 or are part of interactive ports 30) to display a series of interactive menus which are navigated by the guest through the use of keystrokes supplied by remote control 72 (or alternatively game paddle 74 or keyboard 76). Depending upon the selections made by the guest in response to the screens which are displayed, UHC 20 will activate the requested service which may be provided by game platform 26, Internet ports 28, interactive ports 30, multi-media ports 32, digital content server 34, or encoder array 40. The selected output is routed to a modulator representing one of the available channels and sends digital control signals to control card 78 of guest terminal 16 to cause guest terminal 16 to tune to the channel on which the requested service is to appear.

Interactive playback controls offer hotel guests the ability to control viewing or listening to all digital media that is accessible through entertainment system 10. More specifically, interactive playback controls include controls such as play, pause, stop, skip-forward, and skip-back (similar to controls that hotel guests would have on CD players, digital media players, and VCRs) to use when viewing or listening to digital media on entertainment system 10.

There are times when a hotel guest would like to adjust transmission of the entertainment content transmitted from head end 12. For example, if a guest receives a telephone call while viewing or listening to digital content, the guest would like to pause transmission of the content so as to avoid missing a portion of the content. Similarly, if the guest begins to watch a movie or other digital content, but must leave the room part way through the content, the guest would like to be able to stop the content and return to it at a later time. Also, if there are portions of a movie or other digital content that the guest would like to see again, or if there are portions that the guest would like to skip past, the guest would like to be able to skip-back or skip-forward, respectively, through the content.

With the interactive playback controls of the present invention, the guest can adjust transmission of the content as desired. When a guest selects entertainment content from the welcome screen on television 70, UHC 20 activates the requested service as described above. This is done by activating a media daemon file on UHC 20. The media daemon file assembles data associated with the interactive playback controls and sends them, along with a request for the digital content selected by the guest, to DCS 34. Included in the data assembled by the media daemon file are the file location on DCS 34 of the interactive animation file which implements the interactive playback controls, and schedule data. The schedule data tracks the count and duration of use of each of the interactive playback controls and sets the availability of each of the interactive playback controls for the content selected (described in more detail below). The interactive animation file is a binary package which contains all of the graphics and instructions necessary to provide an interactive session.

Figure 2:
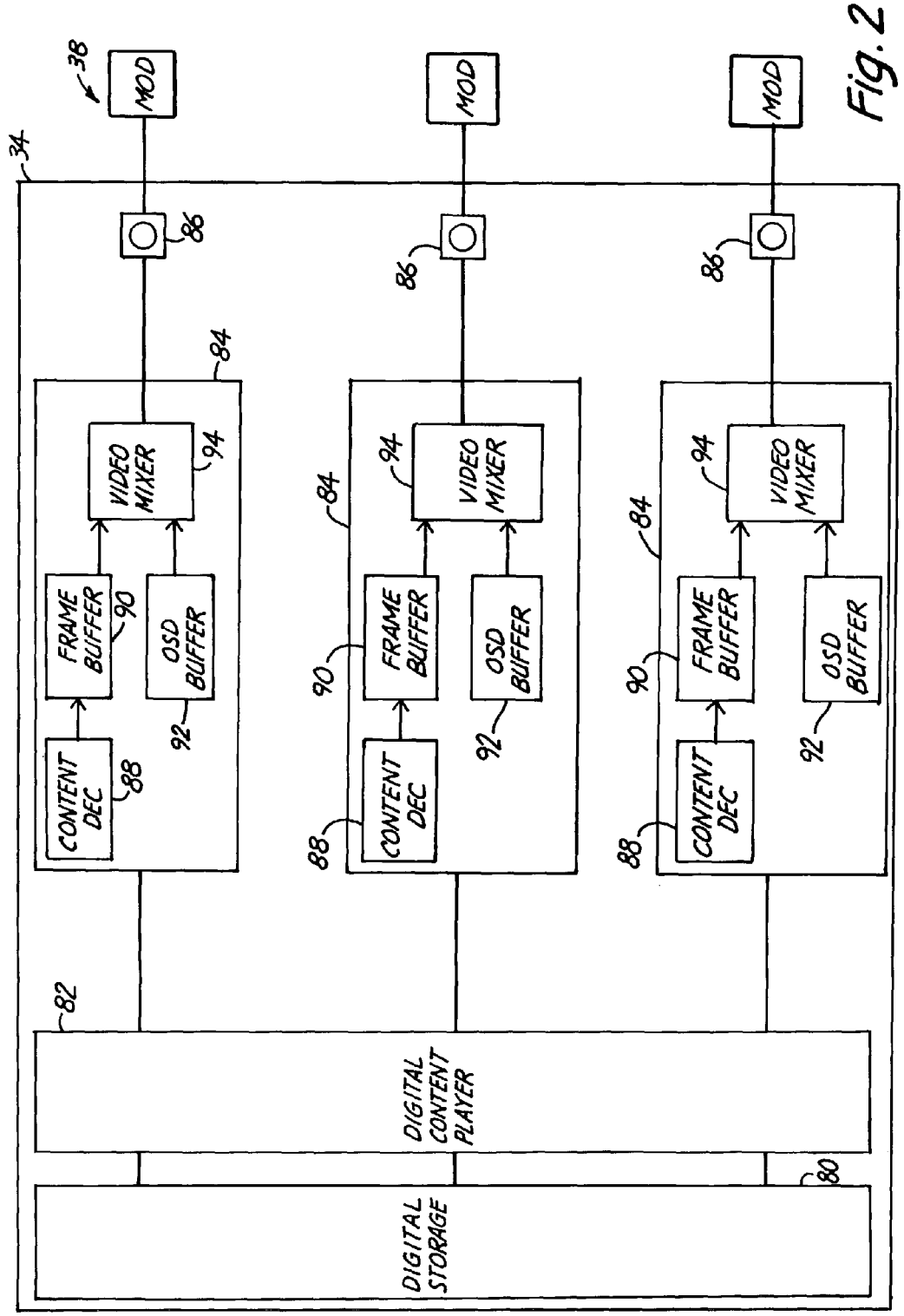
FIG. 2 shows a digital content server connected to a bank of modulators.

FIG. 2 shows DCS 34 connected to bank of modulators 38. DCS 34 includes digital storage device 80 (typically a hard disc array), digital content player 82, control cards 84, and television encoders 86. Each control card 84 includes content decoder 88, frame buffer 90, on-screen display (OSD) buffer 92, and video mixer 94. In a typical entertainment system 10, DCS 34 includes many control cards 84. For clarity, three control cards 84 are shown in FIG. 2.

When DCS 34 receives the data and request from the media daemon file, digital content player 82 is initiated. The requested content and the interactive animation file is streamed from digital storage device 80 to digital content player 82. Digital content player 82 interprets the digital data received from DCS 34 and UHC 20 and sends the data to one of DCS control cards 84. The requested content then streams through content decoder 88 on DCS control card 84. Content decoder 88 decodes the encoded data received from digital content player 82. The decoded content subsequently streams to frame buffer 90. Simultaneously, the interactive animation file streams from digital content player 82 to OSD buffer 92.

The interactive animation file is written in computer code, typically Macromedia Flash, to be interpreted and displayed by OSD buffer 92. The contents of frame buffer 90 and OSD buffer 92 then streams through video mixer 94, where the requested content and the interactive animation file are combined to form interactive content. The resulting interactive content is then converted into television signals by television encoder 86 and sent to one of modulators 38. The interactive content subsequently streams to the appropriate guest terminal 16 through combiner/diplexer 42. The interactive content is then displayed on television 70 at guest terminal 16.

While the guest is viewing or listening to the interactive content, he or she can toggle display of the interactive animation file available for the content selected by pressing a key on remote control 72. When the keystrokes are polled by head end 12 from guest terminal control card 78, as described above, the media daemon file passes all keystrokes to the interactive animation file running on DCS 34. The interactive animation file acts as an interface between the user keystrokes on remote control 72 and DCS 34. The interactive animation file subsequently interprets the keystrokes, and causes DCS 34 to adjust transmission of the digital content according to the feature selected.

When the digital content ends, the media daemon file sends a stop message to the interactive port, and makes the port available for playback of other digital content.

Figure 3:
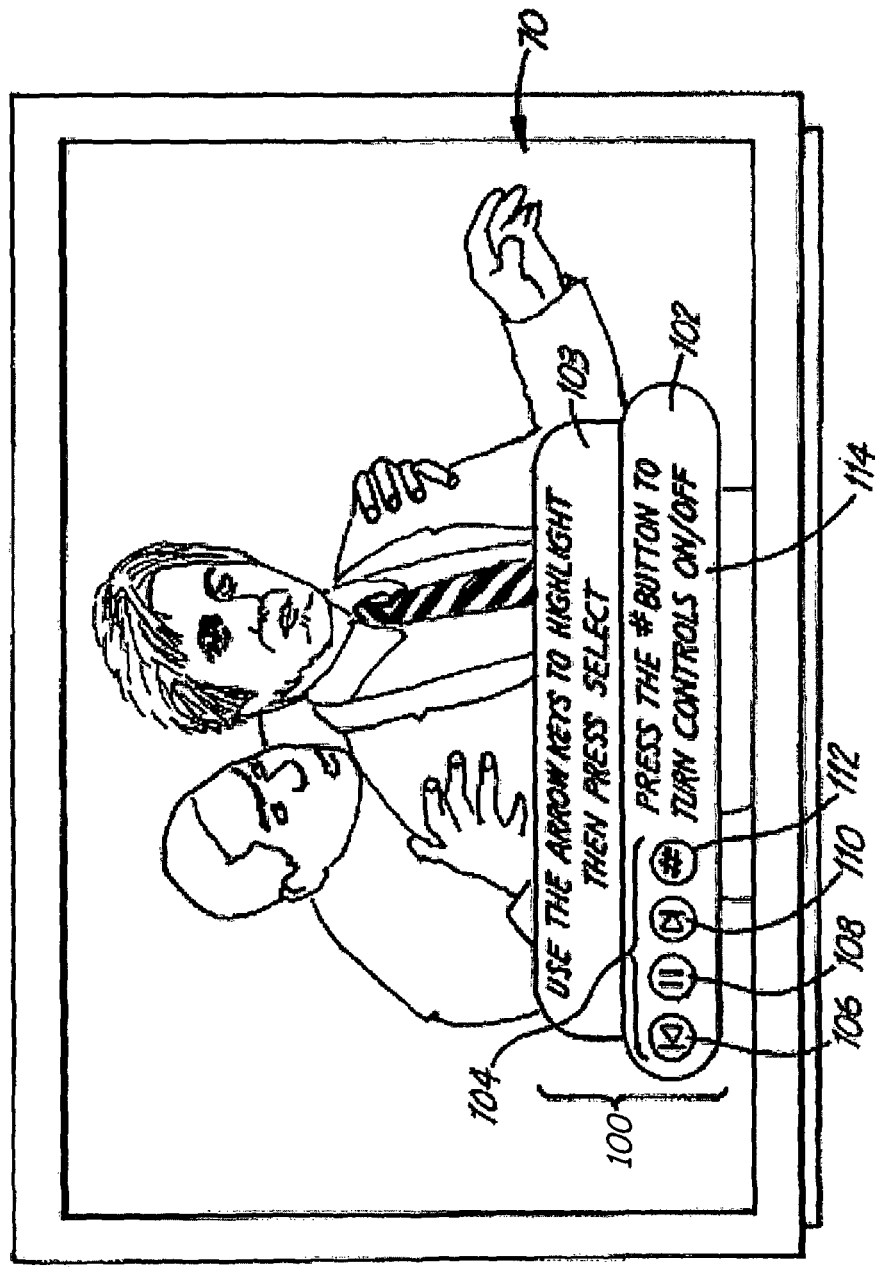
FIG. 3 shows a first exemplary embodiment of an animated interface which implements interactive playback controls on a television screen.
Figure 4:
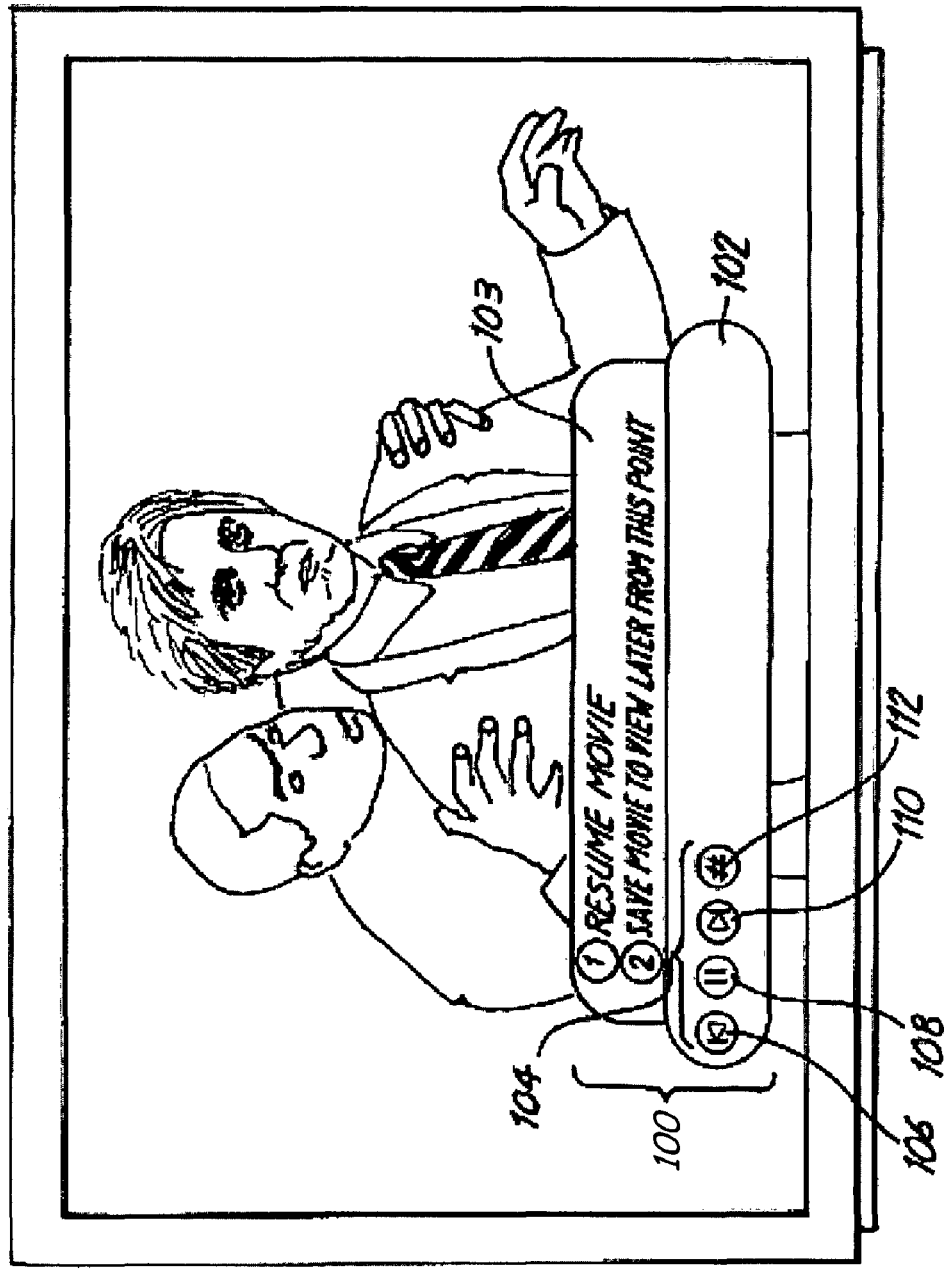
FIG. 4 shows a second exemplary embodiment of an animated interface which implements interactive playback controls on a television screen.

FIGS. 3 and 4 show exemplary embodiments of animated interface 100 which implements the interactive playback controls on television screen 70. FIG. 3 shows animated interface 100 when the interactive playback controls are first displayed. Animated interface 100 includes navigation bar 102 and pop-up tab 103. Navigation bar 102 includes interactive playback controls 104, including skip-back button 106, play/pause button 108, skip-forward button 110, display toggle button 112, and instructions section 114.

Animated interface 100 appears on television screen 70 in response to a guest pressing a key on remote control 72 at guest terminal 16. The information on pop-up tab 103 in FIG. 3 appears during initial display of animated interface 100 to describe how to navigate through interactive playback controls 104. The guest then navigates through interactive playback controls 104 by pressing navigation keys on remote control 72. The guest continues to navigate through interactive playback controls 104 until the desired control is highlighted. The highlighted control appears distinct from the other controls, such as by altering the color of the highlighted control. As each interactive content control is highlighted, a description of the interactive content control or a description of how to select the highlighted control appears in instruction section 104. After one of the interactive playback controls is selected, either the control selected is processed and the content adjusted accordingly, or pop-up tab 103 appears to give the guest further options for the control selected (described in further detail with reference to FIG. 4 below).

FIG. 4 shows animated interface 100 when play/pause button 108 is selected on navigation bar 102. Play/pause button 108 has multiple functions, such as providing the guest with the ability to temporarily pause playback of the content, to resume normal playback of the content after one of the other interactive playback controls has been selected, and to stop (bookmark) the content for later viewing. These controls are similar to the control provided by the pause, play, and stop buttons, respectively, on a DVD player, a CD player, or a VCR. If the content is in normal playback and play/pause button 108 is selected, the content pauses. Pop-up tab 103 appears and typically offers two options: to resume normal playback of the content, or to stop (bookmark) the content and return to the content at a later time at the point at which the content was paused. The guest navigates between these two choices by pressing navigation keys on remote control 72. If the former option is selected, or if no buttons are pressed and the pause cap time is reached, the content resumes normal playback. If the latter option is selected, the content is "bookmarked" where the guest stopped the content, and the guest is given instructions on how to return to the content. The guest may then return to the content at the bookmark point, typically until the guest's stay at the lodging facility ends.

Skip-back button 106 provides the guest with the ability to alter the entertainment content similar to the control provided by the rewind button on a DVD player, a CD player, or a VCR. When a guest selects skip-back button 106, the content briefly pauses and then resumes normal playback at an earlier point in the content. Typically, pop-up tab 103 appears when skip-back button 106 is selected, giving the guest the ability to select the amount of time he or she wishes to skip-back through the content. If there is a cap on the amount of time skip-back button 106 may be used, the content automatically begins normal playback after the cap has been reached. Similarly, if there is a cap on the number of times skip-back button 106 may be used, skip-back button 106 will not be accessible after the cap has been reached.

The functionality of skip-forward button 110 is similar to that of skip-back button 106. Skip-forward button 110 provides the guest with the ability to alter the entertainment content similar to the control provided by the fast-forward button on a DVD player, a CD player, or a VCR. When a guest selects skip-forward button 110, the content briefly pauses and then resumes normal playback at a point later in the content. Typically, pop-up tab 103 appears when skip-forward button 110 is selected, giving the guest the ability to select the amount of time he or she wishes to skip-forward through the content. If there is a cap on the amount of time skip-forward button 110 may be used, the content automatically begins normal playback after the cap has been reached. Similarly, if there is a cap on the number of times skip-forward button 110 may be used, skip-forward button 110 will not be accessible after the cap has been reached.

When the guest selects display toggle button 112, animated interface 100 is hidden. In FIGS. 3 and 4, display toggle button 112 includes a "#" symbol. Typically, there is also a key on remote control 72 that has the "#" symbol on it, having the same functionality as display toggle button 112. Thus, the guest may toggle display of animated interface 100 by either selecting display toggle button 112 on navigation bar 102, or by pressing the corresponding key on remote control 72.

As the guest uses the various interactive playback controls, the time of use and frequency of use of the controls are logged in the schedule data that was assembled when the media daemon file was activated on UHC 20. The schedule data typically includes caps for time of use and/or frequency of use of the controls. These caps are stored in the schedule data in the form of data fields for each of the interactive playback controls. Thus, cap fields are included for pause, skip-back, skip-forward and stop (bookmark) content controls. Typical fields for each of these content controls are as follows:

| Content Control | Typical Fields |
| --- | --- |
| Pause | Total number of seconds of pause time available. Maximum number of seconds per pause |
| Skip-Back | Total number of times the guest may skip backward in the content Number of seconds per skip |

| Content Control | Typical Fields |
|---|---|
| Skip-Forward | Total number of times the guest may skip forward in the content<br>Number of seconds per skip |
| Stop (Bookmark) | Time a bookmark expires (e.g., checkout time) |

Each of the fields which places a cap on the use of the content control may also be given a negative value, indicating no cap on use of the content control.

If, for example, the guest chooses to pause the entertainment content, the schedule data begins tracking use of the pause button. If the maximum number of seconds per pause is reached, the content will automatically begin playing again. After the total number of seconds of pause time available has been reached, the pause function will no longer be available for use. If the schedule data includes a frequency of use cap (i.e., a limit on the number of uses), the pause function will no longer be available after the pause function has been used a certain number of times. The functionality of the fields in the schedule data in association with the other content controls is similar.

Alternatively, a cap may be placed on the overall time the entertainment content selected by the guest will play. The overall time is determined by the length of time for the entertainment content to play unaltered, plus a configurable time of use of the interactive playback controls. As the guest uses the interactive playback controls, the time of use is tracked. When it is determined that further use of the interactive playback controls would result in exceeding the overall time of use cap, the interactive playback controls are made unavailable to the guest.

Navigation bar 102 is illustrative of a typical configuration, but is configurable according to the type of content selected by a hotel guest. For example, if a guest chooses a VOD movie, navigation bar 102 is typically designed to appear partially translucent such that navigation bar 102 does not interfere with viewing of the portion of the VOD movie behind navigation bar. Similarly, if the guest chooses to listen to digital music, navigation bar 102 is typically designed to appear opaque and to include animation and other visual effects.

Availability of interactive playback controls 104 on navigation bar 102 is also configurable according to the type of content selected by a hotel guest. The availability of interactive playback controls 104 is determined by the schedule data that was assembled when the media daemon file was activated on UHC 20. That is, the schedule data includes the appropriate file path on DCS 34 to the file that implements the interactive playback controls that are to be available for the particular type of content selected. For example, it is at times desirable to limit or deny availability of interactive playback controls 104 for certain movies, such as non-theatrical (adult) movies. In this case, the schedule data contains the file path on DCS 34 to the interactive animation file that implements interactive playback controls 104 for non-theatrical movies. Also, certain interactive playback controls may be made unavailable for certain types of entertainment content. For example, the skip-forward and skip-back buttons may be available for theatrical movies, but not for digital music. The schedule data contains the file path on DCS 34 to the interactive animation files that implement these limitations. Plus, the schedule data may include a field that determines the availability of the interactive playback controls that is specific to the guest using the controls. That is, usage of the interactive playback controls may be tracked for a particular guest (over the course of several uses of entertainment system 10), and the availability of the interactive playback controls may be adjusted to better suit the usage patterns of the particular guest. Furthermore, the number of uses and the time of use of interactive playback controls 104 are adjustable for each type of content, by adjusting the cap times in the schedule data as described above. Finally, additional controls, such as track skipping for digital music (similar to the track skip feature on CD players) and scene skipping for VOD movies (similar to the scene skip feature on DVD players), may be included in navigation bar 102 by implementing an interactive animation file containing these additional controls.

As the interactive playback controls are used at a particular lodging facility, the usage statistics are maintained in a log file on UHC 20. This file contains each significant navigation event performed by the guests while viewing or listening to content. In determining the availability of the interactive playback controls for a particular type of content (as set in the schedule data), the log file is analyzed to determine the usage patterns for the interactive playback controls over a desired period of time. After the usage patterns have been analyzed, the interactive playback controls are adjusted as necessary to maximize revenues for the content service provider. For example, W it is determined after analysis that usage of skip-back button 106 or pause button 108 is excessive for a particular type of content (thus occupying the interactive port used for the content for an extended period of time and making it unavailable to other guests), the provider may add a time of use or frequency of use cap in the schedule data for that particular type of content. Similarly, if these caps already exist in the schedule data, the caps may be adjusted to more efficiently use the interactive ports. The process of analyzing the log file on DCS 34 is ongoing, thus allowing the content service provider to adjust availability of the interactive playback controls as necessary to optimize usage of the interactive ports.

Interactive playback controls provide a guest with the ability to control playback of entertainment content on an entertainment system. When a guest selects entertainment content, a media daemon file initiates an interactive animation file on a control card located at the digital content server (DCS) or at the guest's terminal. The interactive animation file corresponds to the type of content selected (e.g., VOD movie, digital music, etc.). The requested content is streamed from the digital content player on the DCS to the frame buffer of the control card, and the interactive animation file is streamed from the digital content player on DCS to the on-screen display (OSD) buffer of the control card. The interactive animation file is written in computer code interpretable by the digital content player and the OSD buffer, typically Macromedia Flash. The contents of the frame buffer and the OSD buffer are then streamed through the video mixer, where the requested content and the interactive animation file are combined to form interactive content. The resulting interactive content is then converted into television signals for display on a television at the guest terminal. The interactive animation file processes all of the keystrokes made by the user while viewing or listening to the content, and relays the keystroke information to the DCS, adjusting the content accordingly. In this regard, the interactive animation file acts as an interface between the user keystrokes at the guest terminal and the DCS. After the content has finished playing, the interactive animation file sends a signal to the media daemon file indicating that the content has finished. The media daemon file then processes the signal and frees up the port that was being used to play the content.

Although the present invention has been described with reference to preferred embodiments, workers skilled in the art will recognize that changes may be made in form and detail without departing from the spirit and scope of the invention. For example, the interactive animation file can be written in any computer language interpretable by entertainment system 10, including Macromedia Flash, Java, dynamic hypertext markup language (D-HTML), virtual reality modeling language (VRML), C/C++, JavaScript, TCL, Perl, or img-prog. Also, control card 84 can alternatively be located at guest terminal 16 rather than DCS 34.

The invention claimed is:

1. A method of providing interactive playback controls for use in conjunction with content provided by a lodging entertainment system having a head end, including a digital content server for storing digital files, and a plurality of guest terminals connected by a distribution system, the method comprising:
   streaming content selected by a guest from the digital content server to a frame buffer;
   streaming an interactive animation file, which implements the interactive playback controls using interactive animation software, from the digital content server to an on-screen display buffer, wherein the interactive playback controls comprise play, pause, stop, skip-forward, and skip-back to provide a guest-selectable interface for controlling playback of the entertainment content;
   combining, in a video mixer at the head end, the content in the frame buffer with the interactive animation file in the on-screen buffer to create interactive content;
   converting the interactive content into television signals for display on a television screen at the guest terminal;
   transmitting, from the guest terminal to the head end, interactive playback control selection data representing the interactive playback control selected by the guest;
   processing the interactive playback control selection data;
   recording the interactive playback control selection data at the head end, wherein the interactive playback control selection data comprises at least one of:
     (a) a length of time the pause control is active for each selection of the pause control for the selected content;
     (b) a length of time the stop (bookmark) control is active for each selection of the stop (bookmark) control for the selected content;
     (c) a length of time the skip-forward control is active for each selection of the skip-forward control for the selected content;
     (d) a length of time the skip-back control is active for each selection of the skip-back control for the selected content;
     (e) a cumulative total length of time the pause control has been activated for the selected content;
     (f) a cumulative total length of time the interactive playback controls have been activated for the selected content;
     (g) a cumulative total number of activations of the skip-forward control for the selected content; and
     (h) a cumulative total number of activations of the skip-back control for the selected content;
   analyzing the interactive playback control selection data at the head end, wherein a limit on use of the interactive playback control for the selected content is determined; and
   adjusting transmission of the interactive content from the head end to the guest terminal in accordance with the interactive playback control selected by the guest if the limit on the use of the interactive playback control for the selected content has not been exceeded.

2. The method of claim 1, wherein display of the interactive playback controls at the guest terminal is toggled by pressing a key on a remote control at the guest terminal.

3. The method of claim 1, wherein an interactive playback control is selectable by using a remote control to navigate through the interactive animation file.

4. The method of claim 1, wherein the interactive animation file is opaque.

5. The method of claim 1, wherein the interactive animation file is partially translucent, such that at least a portion of the content is visible through the interactive animation file.

6. The method of claim 1, wherein the interactive playback control selection data is produced based upon a selection made on the animated interface.

7. The method of claim 1, wherein the frame buffer and the on-screen buffer are on one of a plurality of control cards in the digital content server.

8. The method of claim 1, wherein the frame buffer and the on-screen buffer are on a control card at the guest terminal.

9. The method of claim 1, wherein, prior to streaming the content selected by the guest to the frame buffer, the content is streamed through a content decoder.

10. The method of claim 1, wherein the content is a motion picture.

11. The method of claim 1, wherein the content is digital music.

12. The method of claim 1, wherein the content is time-shifted television programming.

13. A method of providing an animated interactive interface to implement guest-selectable interactive playback controls for use in conjunction with content provided by a lodging entertainment system having a head end and a plurality of guest terminals connected by a distribution system, the method comprising:
   transmitting, from a guest terminal to the head end, content selection data representing the content selected by a guest;
   transmitting, from the head end to the guest terminal, the content selected by the guest;
   displaying the content on a display at the guest terminal;
   creating the animated interactive interface based upon the content selection data;
   displaying the animated interactive interface on the display at the guest terminal with the content;
   analyzing at the head end, content or use factors including content selected, time of day, and use of the interactive play back controls to determine a limit on the use of the interactive playback controls for the content selected, wherein the use of the interactive playback controls comprises at least one of:
     (a) a length of time the pause control is active for each selection of the pause control for the selected content;
     (b) a length of time the stop (bookmark) control is active for each selection of the stop (bookmark) control for the selected content;
     (c) a length of time the skip-forward control is active for each selection of the skip-forward control for the selected content;
     (d) a length of time the skip-back control is active for each selection of the skip-back control for the selected content;
     (e) a cumulative total length of time the pause control has been activated for the selected content;

(f) a cumulative total length of time the interactive playback controls have been activated for the selected content;

(g) a cumulative total number of activations of the skip-forward control for the selected content; and (h) a cumulative total number of activations of the skip-back control for the selected content; and limiting the use of the interactive playback controls for the content selected once the use of the interactive playback controls exceeds the limit.

14. The method of claim 13, wherein the animated interactive interface is transmitted in response to pressing a key on a remote control at the guest terminal.

15. The method of claim 13, wherein the display at the guest terminal is a television screen.

16. The method of claim 13, wherein the animated interactive interface is opaque.

17. The method of claim 13, wherein the animated interactive interface is translucent, such that the content is visible through part of the interactive animation file.

18. An entertainment system comprising:
a plurality of guest terminals;
a distribution system connected to the guest terminals;
a digital content server for storing entertainment content in digital files and supplying to the distribution system television signals based upon the digital files; and
a computer which communicates with the guest terminals over the distribution system, the computer providing the guest terminals with an on-screen animated interactive interface that provides guest-selectable interactive playback controls for controlling playback of the entertainment content, analyzing content and use factors including content selected, time of day, and use of the interactive playback controls to determine a limit on the use of the interactive playback controls, and limiting use of the interactive playback controls after the limit is exceeded, wherein the use of the interactive playback controls comprises at least one of:

(a) a length of time the pause control is active for each selection of the pause control for the selected content;

(b) a length of time the stop (bookmark) control is active for each selection of the stop (bookmark) control for the selected content;

(c) a length of time the skip-forward control is active for each selection of the skip-forward control for the selected content;

(d) a length of time the skip-back control is active for each selection of the skip-back control for the selected content;

(e) a cumulative total length of time the pause control has been activated for the selected content;

(f) a cumulative total length of time the interactive playback controls have been activated for the selected content;

(g) a cumulative total number of activations of the skip-forward control for the selected content.

19. The system of claim 18, wherein, in response to a request from a guest terminal, the computer causes the digital content server to supply television signals based upon the digital file representing the selected program.

20. The system of claim 18, further comprising:
a remote control which communicates with the guest terminal when used by a guest.

21. The system of claim 20, wherein the computer provides the animated interactive interface in response to pressing a key on the remote control at the guest terminal.

22. The system of claim 18, further comprising:
a video mixer which combines the content and the animated interactive interface to provide interactive content.

23. The system of claim 18, wherein the guest terminals include a television.

24. The system of claim 23, wherein the entertainment content and the animated interactive interface are provided simultaneously on the television.

* * * * *

UNITED STATES PATENT AND TRADEMARK OFFICE
CERTIFICATE OF CORRECTION

| | | |
|---|---|---|
| PATENT NO. | : 7,930,721 B1 | Page 1 of 1 |
| APPLICATION NO. | : 10/405711 | |
| DATED | : April 19, 2011 | |
| INVENTOR(S) | : Eric Leslie Hernes | |

It is certified that error appears in the above-identified patent and that said Letters Patent is hereby corrected as shown below:

Col. 10, Line 25
  Delete "W"
  Insert --if--

Signed and Sealed this
Thirteenth Day of November, 2012

David J. Kappos
*Director of the United States Patent and Trademark Office*